(12) United States Patent
Davidovic et al.

(10) Patent No.: US 9,435,701 B2
(45) Date of Patent: Sep. 6, 2016

(54) OPTICAL FIBER STRAIN SENSOR SYSTEM AND METHOD

(71) Applicant: Avago Technologies General IP (Singapore) Pte. Ltd., Singapore (SG)

(72) Inventors: Milos Davidovic, Vienna (AT); Dawid Z. Janse van Vuuren, Pentling (DE); Robert Swoboda, Vienna (AT)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 435 days.

(21) Appl. No.: 14/167,044

(22) Filed: Jan. 29, 2014

(65) Prior Publication Data

US 2015/0211899 A1 Jul. 30, 2015

(51) Int. Cl.
*G01L 1/24* (2006.01)
*G01D 5/353* (2006.01)
*G01H 9/00* (2006.01)

(52) U.S. Cl.
CPC .............. *G01L 1/242* (2013.01); *G01D 5/353* (2013.01); *G01D 5/35303* (2013.01); *G01H 9/004* (2013.01); *G01D 5/35329* (2013.01)

(58) Field of Classification Search
CPC .................. G01L 1/242–1/243; G01D 5/353; G01D 5/35303
See application file for complete search history.

(56) References Cited

U.S. PATENT DOCUMENTS

| 5,381,005 | A | * | 1/1995 | Chazelas | G01M 11/083 250/227.19 |
| 7,359,586 | B2 | * | 4/2008 | Ivtsenkov | G01F 1/206 385/12 |
| 8,310,657 | B2 | | 11/2012 | Olesen | |
| 8,346,032 | B2 | | 1/2013 | Schilling et al. | |
| 2012/0045330 | A1 | | 2/2012 | Wu et al. | |

OTHER PUBLICATIONS

Milos Davidovic, Michael Hofbauer and Horst Zimmermann, A 33×25 μm² Low-Power Range Finder, Institute of Electrodynamics, Microwave and Circuit Engineering, 2012, pp. 922-925, IEEE, Vienna, Austria.

(Continued)

*Primary Examiner* — Jerry Rahll (57) ABSTRACT

An optical fiber strain sensor system and method are provided that use pixels of a three-dimension (3-D) pixel sensor to sense the respective light beams passing out of the ends of a reference fiber and a measurement fiber and for converting the respective light beams into respective electrical signals. Because 3-D camera pixels have photodiodes that are directly connected by switches to integrators within the same die, the need to use separate TIAs and phase detection circuitry in each receive channel is eliminated, which reduces system complexity and overall cost. In addition, omitting the separate TIAs and phase detection circuitry for each channel eliminates the phase uncertainty that can occur when using those components, and thus improves measurement precision.

24 Claims, 7 Drawing Sheets

(56) References Cited

OTHER PUBLICATIONS

Gerald Zach, Milos Davidovic, Horst Zimmermann, Sunlight-proof optical distance measurements with a dual-line lock-in time-of-flight sensor, Analog Integr Circ Sig Process, 2011, pp. 59-68, Springer Science+Business Media, LLC.

J. Renee Pedrazzni, Matt Castellucci, Alex K. Sang, Mark E. Froggatt, Sandie M. Klute, Dawn K. Gifford, Fiber Optic Distributed Strain Sensing Used to Investigate the Strain Fields in a Wind Turbine Blade and in a Test Coupon with Open Holes, 14 pages, Luna Innovations Incorporated, Blacksburg, VA, USA.

Lars Glavind, Ib Svend Olesen, Bjarne Funch Skipper, Martin Kristensen, Fiber-optical grating sensors for wind turbine blades: a review, SPIEDigitalLibrary Optical Engineering, Mar. 2013, pp. 030901-1-030901-9, vol. 52(3), SPIEDigitalLibrary.

* cited by examiner

OPTICAL FIBER STRAIN SENSOR SYSTEM AND METHOD

TECHNICAL FIELD

The invention relates to strain sensor technology, and more particularly, to an optical fiber strain sensor system and method.

BACKGROUND

In recent years, optical fibers have been used as strain sensors for sensing the strain, or stress, placed on a structure. The structure may be, for example, a concrete piling used in a building, a tower, a rotor blade of a windmill, or a wing of an airplane. In such environments, a portion of the strain-sensing fiber is embedded in or attached to the structure. Typically, an adhesive material, such as epoxy, is used to attach the strain-sensing fiber to the structure. The ends of the strain-sensing fiber are optically coupled to measurement equipment. A reference optical fiber is typically laid alongside the strain-sensing fiber on the structure to which the strain-sensing fiber is attached. The ends of the reference fiber are also optically coupled to the measurement equipment.

A laser diode or a light emitting diode (LED) of the measurement equipment is modulated to produce a modulated light beam. An optical splitter of the measurement equipment splits the modulated light beam into first and second modulated light beams, which are then optically coupled into the first ends of the strain-sensing fiber and the reference fiber. The first and second modulated light beams propagate along the two fibers and pass out of the second ends of the fibers. The measurement equipment includes first and second optical sensors that receive the respective light beams and convert the respective light beams into respective electrical signals. Electrical circuitry of the measurement equipment processes the electrical signals to determine the phase differences between them. The phase differences are then used to determine the difference in the lengths of the two fibers.

If stress on the strain-sensing fiber has caused it to become elongated, the measurement equipment will calculate the extent of the elongation over time based on the measured phase differences. The extent of the elongation over time may be used to characterize the strain or stress that has been placed on the structure over time, which, in turn, may be used as a factor in determining the integrity of the structure.

One of the disadvantages of the current approach to measuring the amount of strain that has been placed on the structure is that the measurement equipment is complex, expensive and does not always obtain precise measurements. Every receiver channel uses a separate transimpedance amplifier (TIA) and separate phase detection circuitry to measure the phase of the corresponding received signal. The need to use separate TIAs and phase detection circuitry for each receiver channel increases the system complexity and costs. In addition, the TIAs can introduce phase uncertainty, which can reduce measurement precision.

A need exists for a less complex and more cost effective solution for performing the phase measurements, as well as one that obtains more precise measurements.

SUMMARY

The invention is directed to an optical fiber strain relief system and method. The system comprises a signal generator, at least a first light source, at least a measurement optical fiber secured to a structure, a three-dimensional (3-D) pixel sensor, an analog-to-digital converter (ADC), and phase difference determination logic.

In accordance with a first illustrative embodiment, the signal generator generates a modulated electrical signal that is received by a first light source, which produces a modulated optical signal having a first phase. An optical coupler receives the modulated optical signal and couples at least a measurement optical signal portion of the modulated optical signal into at least a first end of the measurement optical fiber. The 3-D pixel sensor has at least a first pixel that receives the measurement optical signal portion passing out of a second end of the measurement optical fiber and converts it into a first electrical sense signal. The first pixel has a first pixel circuit that receives a clock signal used by the signal generator to generate the modulated electrical signal. The first pixel circuit cross-correlates the clock signal with the first electrical sense signal to produce a first cross-correlation result. The ADC receives the first cross-correlation result and converts it into a first digital cross-correlation result. The phase difference determination logic processes at least the first digital cross-correlation result to determine a change in the phase of the measurement optical signal and to determine, based on the change in the phase of the measurement optical signal, a change in a length of the measurement optical fiber. The change in the length of the measurement optical fiber is indicative of stress or strain in the structure to which the measurement optical fiber is secured.

In accordance with another illustrative embodiment, the system also includes a second light source. The signal generator generates a modulated electrical signal that is received by the first and second light sources. The first and second light sources produce first and second optical signals, respectively, having a first phase, which are then coupled by the optical coupler into first ends of first and second optical fibers, respectively. At least the second optical fiber is secured at multiple locations along the second optical fiber to a structure. The 3-D pixel sensor has at least first and second pixels that receive the first and second optical signals as they pass out of second ends of the first and second optical fibers, respectively. The first and second pixels convert the first and second optical signals into first and second electrical sense signals, respectively. The first and second pixels have first and second pixel circuits, respectively, that receive a clock signal that is used by the signal generator to generate the modulated electrical signal. The first and second pixel circuits cross-correlate the clock signal with the first and second electrical sense signals to produce first and second cross-correlation results, respectively. The ADC converts the first and second cross-correlation results into first and second digital cross-correlation results, respectively. The phase difference determination logic receives at least the first and second digital cross-correlation results from the ADC and processes the first and second cross-correlation results to determine changes in the phases of the first and second optical signals, respectively, and to determine, based on the changes in the phases of the first and second optical signals, changes in lengths of the first and second optical fibers, respectively. The change in the length of the second optical fiber is indicative of stress or strain in the structure to which the second optical fiber is secured.

In accordance with one illustrative embodiment, the method includes the following:

with a signal generator, generating a modulated electrical signal;

driving at least a first light source with the modulated electrical signal to cause the first light source to produce a modulated optical signal having a first phase;

with an optical coupler, coupling at least a measurement optical signal portion of the modulated optical signal into at least a first end of a measurement optical fiber that is secured at multiple locations of the measurement optical fiber to a structure;

in a 3-D pixel sensor, receiving the measurement optical signal portion passing out of a second end of the measurement optical fiber on a first pixel of the 3-D pixel sensor;

with the first pixel, converting the measurement optical signal portion into a first electrical sense signal;

in a first pixel circuit of the first pixel, receiving a clock signal used by the signal generator to generate the modulated electrical signal and cross-correlating the clock signal with the first electrical sense signal to produce a first cross-correlation result;

converting the first cross-correlation result into a first digital cross-correlation result; and in phase difference determination logic, processing at least the first digital cross-correlation result to determine a change in the phase of the measurement optical signal and to determine, based on the change in the phase of the measurement optical signal, a change in a length of the measurement optical fiber, which is indicative of stress or strain in the structure to which the measurement optical fiber is secured.

In accordance with another illustrative embodiment, the method includes the following:

with a signal generator, generating a modulated electrical signal;

driving at least first and second light sources with the modulated electrical signal to cause the first and second light sources to produce first and second modulated optical signals having a first phase;

with an optical coupler, coupling the first and second modulated optical signals into first ends of the first and second optical fibers, respectively;

in a 3-D pixel sensor, receiving the first and second modulated optical signals passing out of second ends of the first and second optical fibers, respectively;

with a first pixel of the 3-D pixel sensor, converting the first modulated optical signal into a first electrical sense signal;

with a second pixel of the 3-D pixel sensor, converting the second modulated optical signal into a second electrical sense signal;

in a first pixel circuit of the first pixel, receiving a clock signal used by the signal generator to generate the modulated electrical signal and cross-correlating the clock signal with the first electrical sense signal to produce a first cross-correlation result;

in a second pixel circuit of the second pixel, receiving the clock signal used by the signal generator to generate the modulated electrical signal and cross-correlating the clock signal with the second electrical sense signal to produce a second cross-correlation result;

converting the first and second cross-correlation results into first and second digital cross-correlation results, respectively; and in phase difference determination logic, processing at least the first and second cross-correlation results to determine changes in the phases of the first and second optical signals, respectively, and to determine, based on the changes in the phases of the first and second optical signals, changes in lengths of the first and second optical fibers. The change in the length of at least the second optical fiber is indicative of stress or strain in a structure to which at least the second optical fiber is secured.

These and other features and advantages of the invention will become apparent from the following description, drawings and claims.

DETAILED DESCRIPTION OF ILLUSTRATIVE EMBODIMENTS

In accordance with an illustrative embodiment, an optical fiber strain sensor system and method are provided that obtain the phase difference measurements that are used to determine changes in the length of the measurement optical fiber in a way that is less complex, more cost effective and more precise than the known solution. In accordance with an illustrative embodiment, three-dimension (3-D) sensor pixels are used as the optical sensors for detecting the respective light beams passing out of the ends of the reference fiber and the measurement fiber and for converting the respective light beams into respective electrical signals. Because 3-D pixels have photodiodes that are directly connected by switches to integrators within the same die, the need to use separate TIAs and phase detection circuitry in each receive channel is eliminated, which reduces system complexity and overall cost. In addition, omitting the separate TIAs and phase detection circuitry for each channel eliminates the phase uncertainty that can occur when using those components, and thus improves measurement precision. Illustrative embodiments will now be described with reference to FIGS. 1-8, in which like reference numerals identify like elements, components or features.

Figure 1:
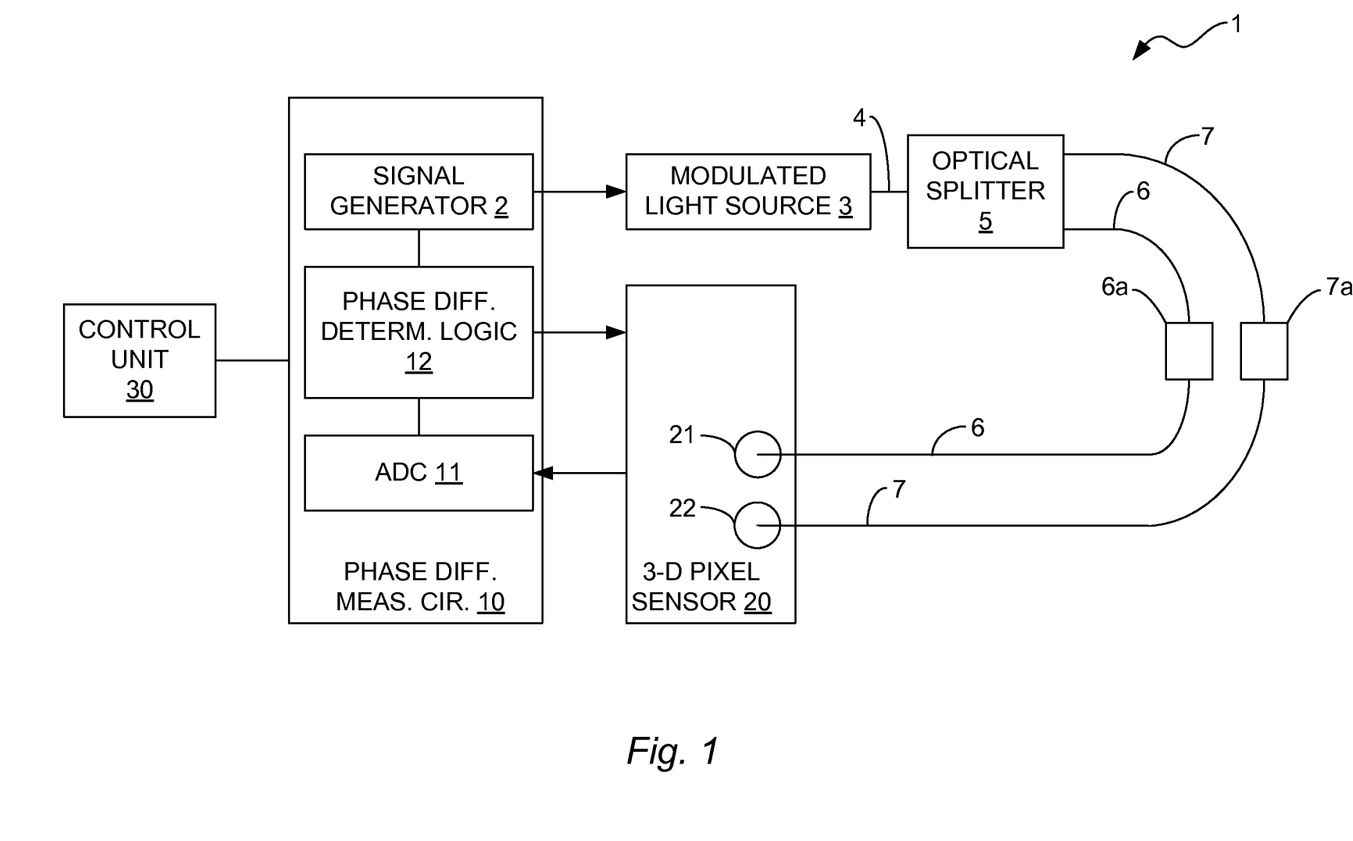
FIG. 1 illustrates the optical fiber strain sensor system in accordance with an illustrative embodiment.

FIG. 1 illustrates the optical fiber strain sensor system 1 in accordance with an illustrative embodiment. A phase difference measurement circuit 10 of the system 1 includes a signal generator 2 for generating an electrical modulated drive signal that drives a light source 3. The light source 3 is typically an LED, but may instead be a laser diode or some other type of light source. The light source 3 generates a chopped optical signal of a particular frequency, $f_{MOD}$. The chopped optical signal is transmitted either in free space or over an optical fiber 4 to an optical splitter 5. The optical splitter 5 receives the chopped optical signal of frequency $f_{MOD}$ and splits the optical signal into first and second optical signals of frequency $f_{MOD}$. One of these signals will be referred to as the reference signal and the other will be referred to herein as the measurement signal.

The reference signal and the measurement signal are optically coupled by the splitter 5 into first ends of a reference fiber 6 and a measurement fiber 7, respectively. Box 6a represents a meander of reference optical fiber of a particular known length disposed in the reference path for carrying the reference signal. Likewise, box 7a represents a meander of measurement optical fiber of a particular known length disposed in the measurement path for carrying the reference signal. The fibers 6/6a and 7/7a are typically plastic fibers, but they may be glass fibers. The opposite ends of the reference and measurement optical fibers 6 and 7 are connected to a 3-D pixel sensor 20 comprising at least two 3-D pixels 21 and 22. These connections may be, for example, connections made by respective connector modules that hold the ends of the respective fiber 6 and 7 or they may be some other type of connection (e.g., a pigtail connection).

The difference between the lengths of the reference path 6/6a and the measurement path 7/7a is a known, fixed value that does not change unless stress or strain is placed on the meander of measurement fiber 7a. The lengths of the reference path 6/6a and the measurement path 7/7a may be exactly the same or they may differ by a known amount. The meander of measurement fiber 7a is secured to a structure (not shown) in such a way that stress or strain on the structure will result in elongation of the fiber 7a. The meander of reference fiber 6a is typically placed alongside the meander of measurement fiber 7a on the same structure, but is not secured to the structure in a way that will result in the meander of reference fiber 6a becoming elongated due to strain or stress in the structure. For example, the meander of measurement fiber 7a may be secured to the structure at multiple contact points between the structure and the fiber 7a whereas the meander of reference fiber 6a may be secured to the structure at only one contact point between the structure and the fiber 6a. Thus, stress on the structure will stretch the measurement fiber 7a, but will not stretch the reference fiber 6a.

The 3-D pixel sensor 20 is typically an integrated circuit (IC) die that contains a large number of the 3-D pixels 21 and 22. Each of the pixels 21 and 22 includes one or more photodiodes (not shown), integrators (not shown) and switching transistors (not shown) for converting the respective optical signal into a respective electrical photocurrent signal, integrating the photocurrent signal, and performing a cross-correlation algorithm, as will be described below in more detail. The results of the cross-correlation algorithm for each of the pixels 21 and 22 are output from the sensor 20 to the phase difference measurement circuit 10. An analog-to-digital converter (ADC) 11 of the phase difference measurement circuit 10 converts the analog cross-correlation result value into a digital value and outputs the digital value to phase difference determination logic 12 of the phase difference measurement circuit 10.

The phase difference determination logic 12 uses the digital values corresponding to the output of pixel 21 over a period of time to construct a correlation triangle for the reference path 6/6a. Likewise, the phase difference determination logic 12 uses the digital values corresponding to the output of pixel 22 over a period of time to construct a correlation triangle for the reference path 7/7a. The phase difference determination logic 12 then takes the Discrete Fourier Transforms (DFTs) of the correlation triangles to obtain the fundamental phases, $\phi_{REF}$ and $\phi_{MEAS}$, of the reference signal and of the measurement signal, respectively. It should be noted that the correlation triangle results from cross-correlating signals that are rectangular in shape. If the signals being cross-correlated are sinusoidal in shape instead of rectangular in shape, then the resulting cross-correlation will also be sinusoidal in shape. For exemplary purposes, only the case of cross-correlating rectangular signals and the resulting correlation triangle is described herein. It should also be noted that there are other operations that can be used to extract the phases from the correlation triangle, so the DFT is given as one example of an operation that can be used for this purpose.

The $\phi_{REF}$ value is used by the phase difference determination logic 12 to compensate for parasitics. Because the identical components are used to construct the paths 6/6a and 7/7a and because the paths are physically close to one another, effects of temperature and other conditions (e.g., vibrations) will be the same on the fibers 6/6a and 7/7a. For this reason, any change in the $\phi_{REF}$ value from an initial value obtained earlier in time when effects of temperature and other conditions were not a factor is attributable to effects of temperature or other environmental conditions. Therefore, the change in the $\phi_{REF}$ value can be used to calibrate the system 1 such that changes in the length of the measurement fiber 7/7a that are not based solely on stress in the structure (not shown) are factored out of the calculation.

As will be described below in more detail, the phase difference determination logic 12 uses the following equation to calculate any change in the distance that the measurement signal traveled over fiber 7/7a, which corresponds to its change in length:

$$\Delta d = \frac{C_0 \Delta \varphi_{TOF}}{4\pi f_{MOD}} \qquad \text{Equation (1)}$$

where $\Delta d$ is the change in the length of the measurement fiber 7/7a, $C_0$ is the speed of light in the medium, $f_{MOD}$ is the modulation frequency of the measurement signal, and $\Delta \phi_{TOF}$ is the change in the phase of the measurement signal compared to an earlier phase value measured by the system 1 when no stress was applied to the structure.

As indicated above, the value of $\Delta d$ obtained from equation (1) may be adjusted to compensate for the effects of environmental effects based on measured change in the phase of the reference signal caused by environmental effects. This compensation algorithm may also be performed by the phase difference determination logic 12 or it may be performed by some other processing device of the system 1. To perform the compensation method, the same process that was described above to determine $\Delta d$ for the measurement fiber 7/7a, referred to hereinafter as $\Delta d_{MEAS}$, is performed for the reference fiber 6/6a to determine $\Delta d$ for the reference fiber 6/6a, referred to hereinafter as $\Delta d_{REF}$. The value of $\Delta d_{REF}$ is then multiplied by some other function to obtain a compensation value, $\Delta d_{COMP}$, which is then subtracted from $\Delta d_{MEAS}$ to obtain a compensated value, $\Delta d_{MEAS\_COMP}$.

The function that is used for this purpose is typically a scalar such that $\Delta d_{COMP}$=scalar value×$\Delta d_{REF}$, but more complex functions may be used for this purpose. The scalar value will depend on the types of environmental conditions that are being compensated and on the difference between the initial lengths of the reference and measurement fibers 6/6a and 7/7a, respectively. The scalar value will typically be determined through experimentation and then the system 1 will be calibrated to use the scalar value. Persons of skill in the art will understand the manner in which such experimentation and calibration processes are performed, and therefore a detailed discussion of those processes will not be further described herein.

It should be noted that if environmental conditions do not change over time and/or are considered to be negligible, the reference path 6/6a can be eliminated altogether, in which case only the measurement path calculations are performed to determine the value of $\Delta d_{MEAS}$. If the reference path 6/6a is eliminated, the optical splitter 5 may be replaced with an optical coupler of any suitable type for coupling the measurement optical signal into the end of the measurement fiber 7. It should also be noted that in cases where the reference fiber 6/6a is included, the reference fiber 6/6a can be longer, shorter or the same length are the measurement fiber 7/7a as long as the length of the reference fiber 6/6a is known. The lengths of the reference and measurement fibers 6/6a and 7/7a relative to one another are taken into account in scaling $\Delta d_{REF}$ to obtain $\Delta d_{COMP}$, which is then subtracted from $\Delta_{MEAS}$ to obtain $\Delta d_{MEAS\_COMP}$.

The 3-D pixel sensor 20 may be a known 3-D pixel sensor of the type that is used in known 3-D cameras. One example of such a sensor is a 3-D pixel sensor having 200×200 pixels at 45×45 µm² each employed in a CamCube 3.0 camera offered by a company called PMD Technologies of Siegen, Germany. Another example of such a sensor is a 3-D pixel sensor having 176×144 pixels at 40×40 µm² each employed in an SR4000 3-D camera offered by a company called Mesa Imaging of Zurich, Switzerland. The invention is not limited to using any particular type of 3-D pixel sensor for this purpose, but the above are a few examples of 3-D pixel sensors that are suitable for use with the invention and that are currently available on the market.

Such 3-D pixel sensors have been used in the past to perform time-of-flight (TOF) algorithms in TOF range finder systems. Such range finder systems have been used in 3-D-based input devices for gaming applications such as, for example, in video game consoles. They have also been used in TV remote control devices to provide gesture control in TV systems. In such range finder systems, an optical signal is transmitted by the range finder over an air interface to a target and the light reflected off of the target that returns to the range finder is processed in accordance with a TOF algorithm to determine the distance from the range finder to the target.

Because of the diffuse nature of the reflection of light from the target, such systems are designed to measure relatively short distances, i.e., distances ranging from a few meters up to several meters. In addition, the transmitted optical signal is of relatively high power (e.g., in the Watt range), although the reflected signal is only in the range of tens of nanowatts due to the diffuseness of the reflections. In accordance with illustrative embodiments being described herein, the reference and measurement optical fibers 6/6a and 7/7a are at least tens of meters in length, e.g., 100 meters (m). The fibers 6/6a and 7/7a are typically not much shorter than 100 m, but may be considerably longer than 100 m. The reason for the relatively long lengths of the fibers 6/6a and 7/7a is that a very small amount of stretching or elongation of the fiber 7/7a needs to be measured, and the longer lengths eases the requirements on the measurement circuitry. In other words, the longer the fibers 6/6a and 7/7a are, the more accurate the measurements will be. Also, unlike the range finder systems, the power of the transmitted reference and measurement signals used in the system 1 is very low, e.g., about a microwatt.

Another difference between the known range finder systems and the fiber strain sensor system of the present invention is that range finder systems encounter a limitation known as the unambiguity range. The unambiguity range describes the distance that can be covered by the 3-D camera with certainty. Because the camera tends to cover a distance of several meters, at most, due to optical power constraints, the modulation frequency $f_{MOD}$ that can be used is limited. In particular, the modulation frequency $f_{MOD}$ that can be used in the range finder is inversely related to the measurement distance. For example, a modulation frequency of 5 megahertz (MHz) can be used for distances up to about 30 m and a modulation frequency of about 30 MHz can be used for distances up to about 5 m.

The fiber strain sensor system of the present invention typically, but not necessarily, uses a modulation frequency $f_{MOD}$ of about 240 MHz. Of course, the invention is not limited to using any particular modulation frequency $f_{MOD}$ or range of modulation frequencies. In the known range finder system, using this frequency would limit the distance to about 62.5 centimeters (cm), which would not be useful for most range finder applications. Thus, it would appear that a 3-D pixel sensor of a 3-D camera would not be suitable for use with the fiber strain sensor system of the present invention due to the fiber lengths being outside of the unambiguity range for the chosen modulation frequency. Also, the transmit power of the range finder system is typically much higher than that which is used in the fiber strain sensor system.

In accordance with the present invention, it was observed by the inventors that while the range finder approach cannot be used to determine the lengths of the reference and measurement fibers 6/6a and 7/7a at higher modulation frequencies (e.g., 240 MHz) due the fiber lengths being outside of the unambiguity range, such an approach can be used to determine the change in the length of the measurement fiber, as will be described below in more detail. Thus, it was determined that the known cross-correlation algorithm used in range finder systems can be used in the fiber strain sensor system to determine a change in phase of the measurement signal and that the change in phase of the measurement signal can be used to determine the change in length of the measurement fiber, as described above with reference to equation (1).

The manner in which the cross-correlation algorithm is performed will now be described. The following discussion assumes that a reference fiber 6/6a is used in order to compensate for environmental effects. As indicated above, it is not necessary in all cases to use the reference fiber 6/6a, particularly in cases where environmental effects are not expected to change over time or are considered negligible.

Because the cross-correlation algorithm is performed in the same way for the reference fiber 6/6a and for the measurement fiber 7/7a, the algorithm will only be described with reference to the measurement fiber 7/7a and pixel 22. The measurement signal received at pixel 22 and converted into the electrical domain will be referred to as $S_{REC}$. This signal can be considered an attenuated derivate of the electrical modulation signal output from the signal generator 2 to the light source 3 bearing runtime information expressed as:

$$S_{REC}(t)=\alpha S_{MOD}(t-t_{TOF}), \qquad \text{Equation (2)}$$

where t is time, $\alpha$ is an attenuation constant, $S_{MOD}$ is the electrical modulation signal output from the signal generator 2, and $t_{TOF}$ is "time of flight," which is the amount of time that it takes the optical signal to traverse the measurement path 7/7a.

Assuming that $S_{MOD}$ is a rectangular modulation (i.e., square wave), then $S_{REC}$ also has a rectangular shape, and is essentially an attenuated version of $S_{MOD}$. The correlation function is a triangular function over time, which is approximated by N discrete steps, to be called phase steps in the following, where N is a positive integer. For illustrative purposes, it will be assumed that N=16. The continuous-time correlation function is expressed as:

$$CF(\tau)=\int s_{REC}(t)s_{CLK}(t+\tau)dt, \qquad \text{Equation (3)}$$

where $S_{ax}$ is the fixed modulation clock signal used by the signal generator 2 to generate the electrical modulation signal that is delivered to the light source 3. It can be seen from equation (3) that a time-shifted derivate of the fixed modulation clock signal $S_{CLK}$ is needed. In order to sample the correlation triangle at N points, the modulation signal $S_{MOD}$ is processed according to $s_{MOD}(t)=s_{CLK}(t-n/Nf_{MOD})$, where n is a phase step counter. The multiplication and integration operations in equation (3) are performed in the circuitry of the pixel 22 over a predetermined time period to produce the cross-correlation result value that is output from the pixel 22 to the phase difference measurement circuit 10.

As the cross-correlation result values of equation (3) are output from the pixel 22 to the phase difference measurement circuit 10, they are digitized by the ADC 11 and used by the phase difference determination logic 12 to construct the correlation triangle. Once the correlation triangle has been constructed, the phase difference determination logic 12 computes the DFT of the correlation triangle to obtain the fundamental phase $\phi_{MEAS\_TEST}$ of the measurement signal. This phase value is then processed by the phase difference determination logic 12 in the manner described above to obtain $\Delta\phi_{TOF}$, which is the change in the phase of the measurement signal compared to an earlier phase value measured by the system 1 when no stress was applied to the structure. This phase change value is then processed by the phase difference determination logic 12 in accordance with equation (1) to obtain the value $\Delta d_{MEAS}$. The same process that was used to determine $\Delta d_{MEAS}$ is performed for the reference fiber 6/6a to determine $\Delta d_{REF}$. The value of $\Delta d_{REF}$ is then multiplied by some other function (e.g., a scalar value that is greater than zero) to obtain a compensation value, $\Delta d_{COMP}$, which is then subtracted from $\Delta d_{MEAS}$ to obtain a compensated value, $\Delta d_{MEAS\_COMP}$. This value, $\Delta d_{MEAS\_COMP}$, can be the final value that is delivered to the control unit 30.

As indicated above, one of the advantages of using the 3-D pixel sensor 20 over other types of sensors that have been used in known optical fiber strain sensor systems is that the 3-D pixel sensor 20 has built-in circuitry for performing the multiplication and integration operations of the cross-correlation algorithm represented by equation (3). This built-in circuitry eliminates the need to use a separate TIA and phase detection circuit for each receive channel. Eliminating the need to employ a separate TIA and phase detection circuit for each receive channel reduces system complexity and costs. In addition, implementing the 3D pixel sensor 20 on a single die provides robustness against process tolerances, which improves the precision with which measurements are obtained compared to systems that use separate circuitry on each receive channel to obtain the same measurements.

The phase difference measurement circuit 10 is a processor of some type, such as, for example, a field programmable gate array (FPGA) or a digital signal processor (DSP). The circuit 10 may be any type of processing device capable of being programmed or configured to perform the processing tasks described above with reference to FIG. 1. The circuit 10 may be implemented on a single integrated circuit (IC) die or it may be a combination of IC dies implemented on a circuit board, such as a printed circuit board (PCB), a printed wiring board (PWB), or a flex circuit, for example. The circuit 10 and the 3-D pixel sensor 20 may be implemented on a single die, or they may be implemented on separate dies and mounted on the same or different circuit boards. The control unit 30 may be a separate processor or it may be implemented together with the phase difference measurement circuit 10 and/or the 3-D pixel sensor 20 on a single IC die. Typically, all of the components shown in FIG. 1 other than the fibers 6/6a and 7/7a are mounted on the same circuit board.

The light source 3 is typically implemented on its own die and mounted on the same circuit board on which the control unit 30, the phase difference measurement circuit 10 and the 3-D pixel sensor 20 are mounted. Although a single light source 3 is shown in FIG. 1, multiple light sources may be implemented in the system 1. For example, in the case where there are two channels, i.e., a single reference signal and a single measurement channel, the system 1 may include two light sources 3. Having a separate light source for each channel obviates the need for the optical splitter 5. The light sources 3 are typically either laser diodes or LEDs that are typically implemented on the same die and supplied with the same modulation signal from the signal generator 2. Using the same modulation signal to drive the multiple light sources 3 ensures that the optical signals produced by the light sources and coupled into the ends of the fibers 6 and 7 are in phase with one another.

The above cross-correlation method indirectly determines the TOF by first acquiring the phase from the correlation triangle and then, knowing the modulation frequency, calculating the time delay. An alternative to this method is a direct TOF method. The direct TOF method uses light pulses of very short duration and of relatively high peak-power. The pulses are generated by the signal generator 2 and used to drive the light source(s) 3. In the case where the system 1 uses a single light source 3 and an optical splitter 5, the light source 3 generates the pulse, which is then split by the splitter 5 and coupled into the ends of the optical fibers 6 and 7. At the opposite ends of the fibers 6 and 7 (where the fibers 6 and 7 interface with the sensor 20), the pulses are sensed by the pixels 21 and 22 and converted into electrical analog signals. In accordance with this embodiment, the phase difference measurement circuitry 10 includes circuitry that uses counters that count from the times of departure until the times of arrival of the reference and measurement signals. The counts represent the TOFs of the reference and measurement signals (TOF is the difference between the departure and arrival times). The TOFs can then be used in the following equation to determine the change in the length of the measurement and reference fibers 7/7a and 6/6a, respectively:

$$\Delta d=(c_0\Delta t_{TOF})/2, \qquad \text{Equation (4)}$$

where $\Delta t_{TOF}$ is the difference between an initial TOF measurement obtained when no stress is placed on the structure and a TOF measurement taken during a test when stress is expected to be placed on the structure. Equation (4) may be used to determine $\Delta d_{MEAS}$ and $\Delta d_{REF}$ in a manner similar to the manner in which equation (1) above was used to determine these values. The values of $\Delta d_{COMP}$ and $\Delta d_{MEAS\_COMP}$ can then be computed in the manner described above and the value of $\Delta d_{MEAS\_COMP}$ can be delivered to the control unit 30. With the TOF approach, other sensor types may be used in place of the 3-D pixel sensor 20, such as, for example, a single photon avalanche diode (SPAD).

Figure 2:
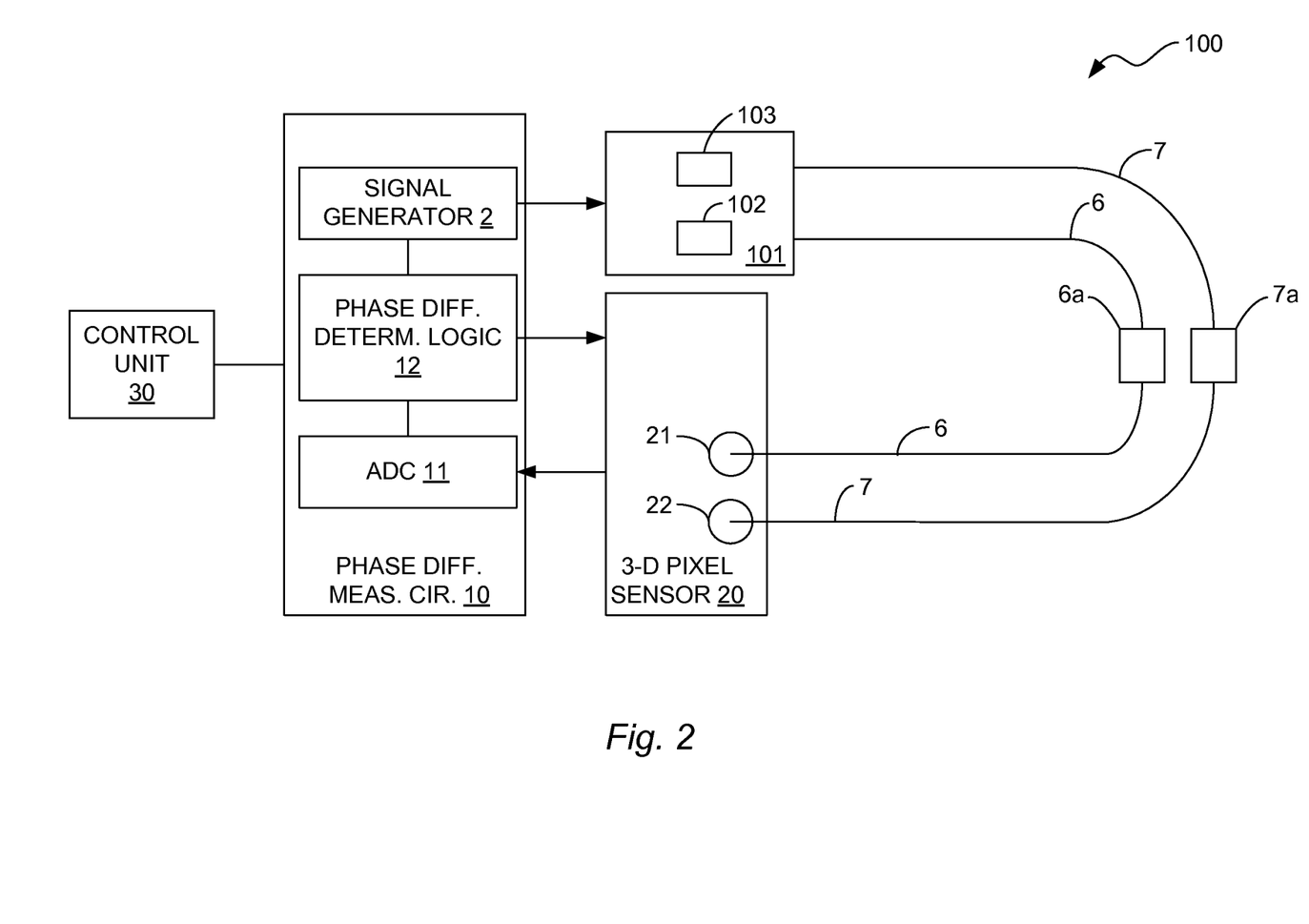
FIG. 2 illustrates another illustrative embodiment of the optical fiber strain relief system in which the single light source shown in FIG. 1 has been replaced by a light source array having first and second light sources formed on the same die.

FIG. 2 illustrates another illustrative embodiment of the optical fiber strain relief system 100 in which the single light source 3 shown in FIG. 1 has been replaced by a light source array 101 having first and second light sources 102 and 103 formed on the same die. Both of the light sources 102 and 103 are driven by the same electrical modulation signal output from the signal generator 2. Although it is not necessary for the light sources 102 and 103 to be on the same die, having them on the same die helps ensure that the optical signals produced by the light sources 102 and 103 are in precise phase alignment. If the light sources 102 and 103 produce optical signals of very high frequency, it is not necessary for the light sources 102 and 103 to be on the same die because their mismatch only introduces an offset in the measured phase. The reference optical signal and the measurement optical signal generated by the light sources 102 and 103 are coupled into the ends of the fibers 6 and 7, respectively. The manner in which the system 100 operates is identical in all other respects to that described above with reference to FIG. 1.

Although the illustrative embodiments described above assume that there is a single measurement path 7/7a, the systems 1, 100 may have multiple measurement paths in order to allow stress or strain to be measured at different locations on the same structure. Each of the measurement signals will then be processed in the manner described above with reference to equations (1)-(3) or in the manner described above with reference to equation (4) to determine the elongation of the measurement fibers.

Another advantage of using the 3-D pixel sensor 20 shown in FIGS. 1 and 2 is that it relaxes alignment requirements for aligning the second ends of the fibers 6 and 7 with the pixels 21 and 22, respectively, of the 3-D pixel sensor 20. As indicated above, known 3-D pixel sensors have pixel arrays with hundreds or thousands of pixels (e.g., 200×200 pixels at 45×45 µm² and 176×144 pixels at 40×40 µm²). Each of the optical signals passing out of the ends of the fibers 6 and 7 can be directed onto a respective spot on the array comprising a plurality of pixels rather than onto a single pixel. Directing each of the optical signals onto a spot on the array comprising a plurality of pixels obviates the need to precisely align the ends of the fibers 6 and 7 with the single pixels 21 and 22, respectively. Known pixel averaging algorithms or known advanced signal processing algorithms may then be performed by the circuitry of the 3-D pixel sensor 20 to determine the locations of the spots. The cross-correlation or TOF algorithms described above are then used to determine the change in phase or the change in TOF, from which the corresponding elongation of the measurement fiber 7/7a is obtained.

Figure 3:
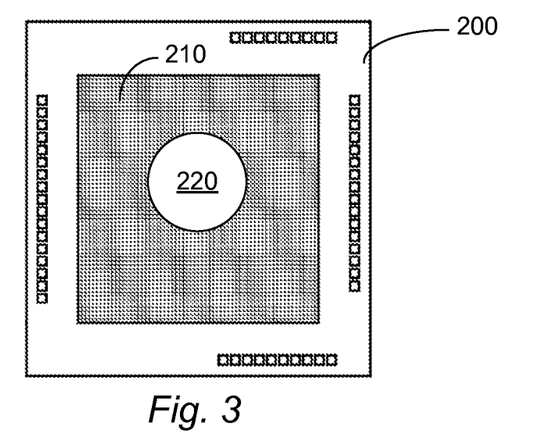
FIG. 3 illustrates a block diagram of an array of pixels of the 3-D pixel sensor shown in FIGS. 1 and 2 on which a light beam forms a spot on the array that covers multiple pixels.

FIG. 3 illustrates a block diagram of an array 200 of pixels 210 of the 3-D pixel sensor 20 shown in FIGS. 1 and 2 on which a light beam forms a spot 220 on the array 200. Each pixel 210 is represented in FIG. 3 by a small square box. The spot 220 covers a large number of the pixels 210. Averaging or other known signal processing algorithms are used to scan the array 200 to identify the pixels that are covered by the spot 220 and to identify the pixel or group of pixels in the center and edges of the spot 220. The only alignment precaution that needs to be taken is to coarsely align the end of the fiber (not shown) with the array 200 to ensure that the beam passing out of the end of the fiber lands somewhere on the array 200. The cross-correlation or TOF algorithm is performed in the same manner described above with reference to FIG. 1.

Figure 4:
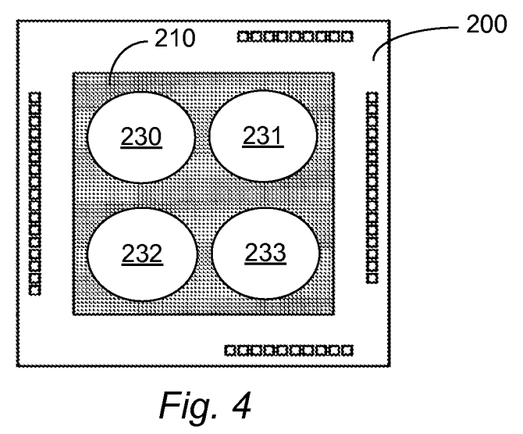
FIG. 4 illustrates a block diagram of the array of pixels shown in FIG. 3 on which four light beams form respective spots on the array, where each spot covers multiple pixels of the array.

FIG. 4 illustrates a block diagram of the array 200 of pixels 210 shown in FIG. 3 having four light beams forming respective spots 230-233 on the array 200. Each of the spots 230-233 covers a large number of the pixels 210. Averaging or other known signal processing algorithms are used to scan the array 200 to identify the pixels 210 that are covered by the spots 230-233 and to identify the centers and edges of the spots 230-233. The only alignment precautions that need to be taken are to coarsely align the ends of the fibers (not shown) with the array 200 to ensure that the beams passing out of the ends of the fibers land somewhere on the array 200. Each fiber is easily associated with its respective spot based on the known general location of the spot on the array 200 and the known general spatial arrangement of the fiber ends relative to the array 200. The cross-correlation or TOF algorithm is performed in the same manner described above with reference to FIG. 1 or 2, respectively.

Figure 5:
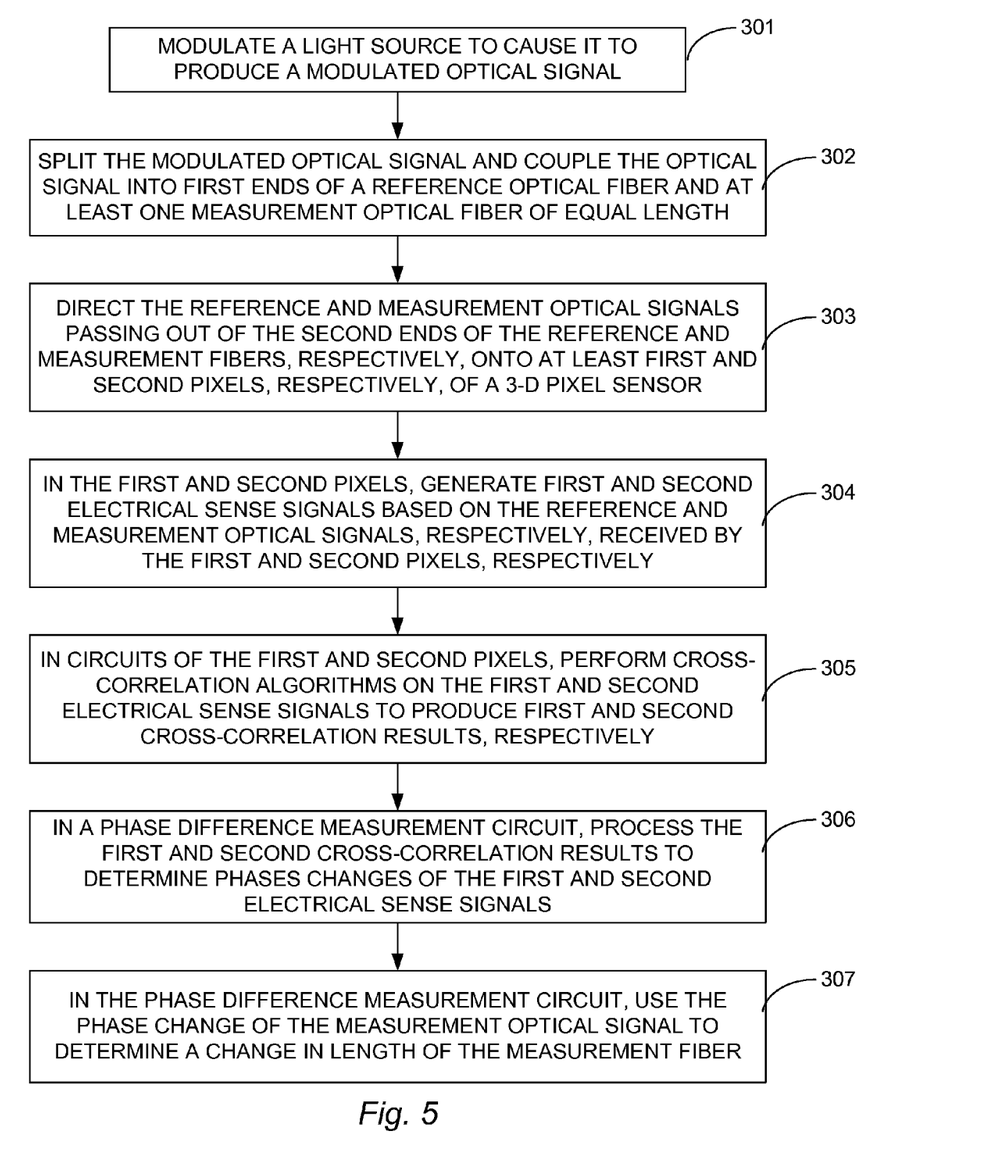
FIG. 5 illustrates a flowchart that represents the method in accordance with an illustrative embodiment for sensing strain in an optical fiber using a system of the type shown in FIG. 1.

FIG. 5 illustrates a flowchart that represents the method in accordance with an illustrative embodiment for sensing strain in an optical fiber using a system of the type shown in FIG. 1. This example assumes that a reference fiber is also used to compensate for environmental effects, which, as stated above, is not always the case. A light source is modulated with a modulation signal to cause the light source to generate an optical signal, as indicated by block 301. The optical signal is split and coupled into a first end of a reference optical fiber and into a first end of at least one measurement optical fiber, as indicated by block 302. The reference and measurement optical signals passing out of second ends of the reference and measurement optical fibers, respectively, are directed onto at least a first and second pixels, respectively, of a 3-D pixel sensor, as indicated by block 303.

The first and second pixels generate first and second electrical sense signals, respectively, based on the reference and measurement optical signals received by the first and second pixels, respectively, as indicated by block 304. In circuitry of the first and second pixels, cross-correlation algorithms are performed on the first and second electrical sense signals, respectively, to produce first and second cross-correlation results, as indicated by block 305. The first and second cross-correlation results are processed in a phase difference measurement circuit to determine the phase changes of the first and second electrical sense signals, as indicated by block 306. The phase difference measurement circuit then processes the phase change of the measurement optical signal to determine a change in the length of the measurement fiber, as indicated by block 307.

As indicated above, if environmental effects are not of concern, the reference fiber can be eliminated, in which case the steps in FIG. 5 that relate to the reference signal and to the corresponding electrical sense signal can also be eliminated. If environmental effects are to be taken into consideration, then the result obtained at block 307 is further processed based on the phase change of the reference signal determined at block 306 in the manner described above with reference to FIG. 1 to compensate for environmental effects.

Figure 6:
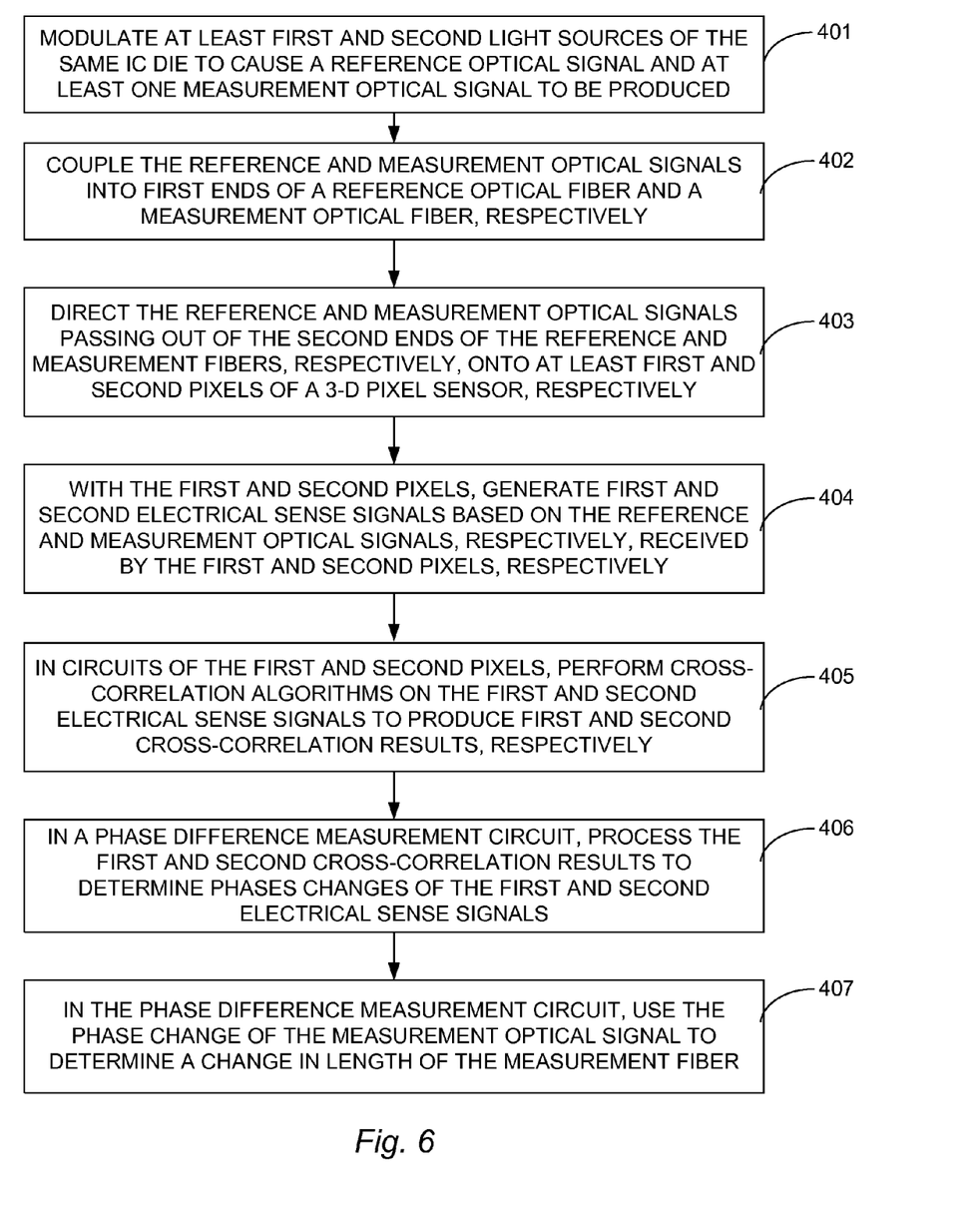
FIG. 6 illustrates a flowchart that represents the method in accordance with another illustrative embodiment for sensing strain in an optical fiber using a system of the type shown in FIG. 2.

FIG. 6 illustrates a flowchart that represents the method in accordance with another illustrative embodiment for sensing strain in an optical fiber using a system of the type shown in FIG. 2. This example assumes that a reference fiber is also used to compensate for environmental effects, which, as stated above, is not always the case. At least first and second light sources of the same die are modulated with a modulation signal to cause the light sources to generate a reference optical signal and at least one measurement optical signal, as indicated by block 401. The reference and measurement optical signals are coupled into first ends of a reference optical fiber and a measurement optical fiber, respectively, as indicated by block 402. The reference and measurement optical signals passing out of second ends of the reference and measurement optical fibers, respectively, are directed onto at least first and second pixels, respectively, of a 3-D pixel sensor, as indicated by block 403.

The first and second pixels generate first and second electrical sense signals, respectively, based on the reference and measurement optical signals received by the first and second pixels, respectively, as indicated by block 404. In circuitry of the first and second pixels, cross-correlation algorithms are performed on the first and second electrical sense signals, respectively, to produce first and second cross-correlation results, as indicated by block 405. The first and second cross-correlation results are processed in a phase difference measurement circuit to determine the phase changes of the first and second electrical sense signals, as indicated by block 406. The phase difference measurement circuit then uses the phase change of the second electrical sense signal to determine a change in the length of the measurement fiber, as indicated by block 407.

As indicated above, if environmental effects are not of concern, the reference fiber can be eliminated, in which case the steps in FIG. 6 that relate to the reference signal and to the corresponding electrical sense signal can also be eliminated. If environmental effects are to be taken into consideration, then the result obtained at block 407 is further processed based on the phase change of the reference signal determined at block 406 in the manner described above with reference to FIG. 1 to compensate for environmental effects.

Figure 7:
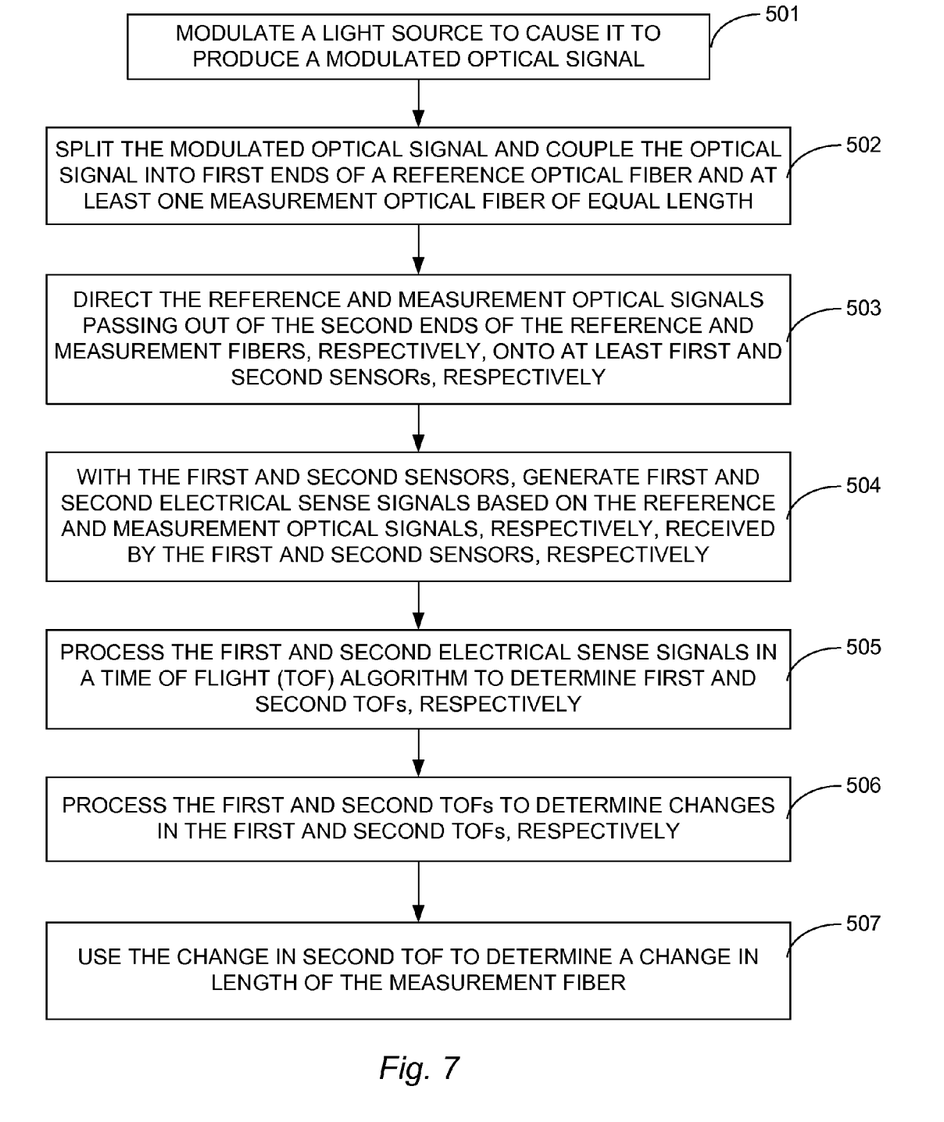
FIG. 7 illustrates a flowchart that represents the method in accordance with an illustrative embodiment for sensing strain in an optical fiber using a system of the type shown in FIG. 1 to perform a time-of-flight (TOF) algorithm.

FIG. 7 illustrates a flowchart that represents the method in accordance with an illustrative embodiment for sensing strain in an optical fiber using a system of the type shown in FIG. 1 to perform a TOF algorithm. A light source is modulated with a modulation signal to cause the light source to generate an optical signal, as indicated by block 501. The optical signal is split and coupled into a first end of a reference optical fiber and into a first end of at least one measurement optical fiber, as indicated by block 502. The reference and measurement optical signals passing out of second ends of the reference and measurement optical fibers, respectively, are directed onto at least a first and second sensors, respectively, as indicated by block 503. As indicated above with reference to FIG. 1, the sensors that are used for this purpose may be pixels of a 3-D pixel sensor or they may be some other type of sensor, such as a SPAD.

The first and second sensors generate first and second electrical sense signals, respectively, based on the reference and measurement optical signals received by the first and second sensors, respectively, as indicated by block 504. A processor processes the first and second electrical sense signals in accordance with a TOF algorithm to determine first and second TOFs of the reference and measurement optical signals, respectively, as indicated by block 505. The processor then processes the first and second TOFs to determine changes in the first and second TOFs, as indicated by block 506. The processor then processes the change in the second TOF to determine a change in the length of the measurement fiber, as indicated by block 507.

If environmental effects are not of concern, the reference fiber can be eliminated, in which case the steps in FIG. 7 that relate to the reference signal and to the corresponding electrical sense signal can also be eliminated. If environmental effects are to be taken into consideration, then the result obtained at block 507 is further processed based on the TOF change of the reference signal determined at block 506 in the manner described above with reference to FIG. 1 to compensate for environmental effects.

Figure 8:
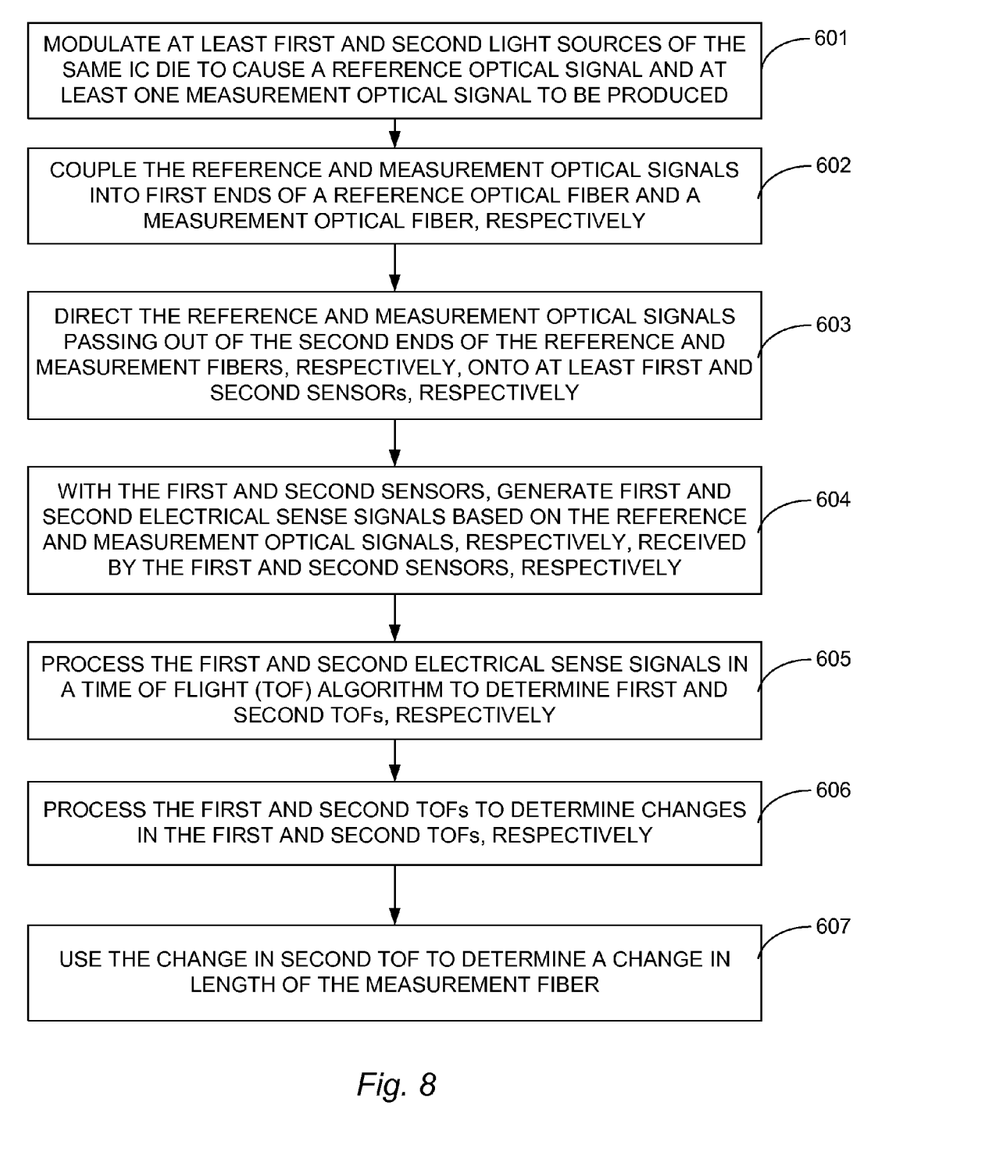
FIG. 8 illustrates a flowchart that represents the method in accordance with an illustrative embodiment for sensing strain in an optical fiber using a system of the type shown in FIG. 2 to perform a TOF algorithm.

FIG. 8 illustrates a flowchart that represents the method in accordance with an illustrative embodiment for sensing strain in an optical fiber using a system of the type shown in FIG. 2 to perform a TOF algorithm. At least first and second light sources of the same die are modulated with a modulation signal to cause the light sources to generate a reference optical signal and at least one measurement optical signal, as indicated by block 601. The reference and measurement optical signals are coupled into first ends of a reference and a measurement optical fiber, respectively, as indicated by block 602. The reference and measurement optical signals passing out of second ends of the reference and measurement optical fibers, respectively, are directed onto at least a first and second sensors, respectively, as indicated by block 603. Again, the sensors that are used for this purpose may be pixels of a 3-D pixel sensor or they may be some other type of sensor, such as a SPAD.

The first and second sensors generate first and second electrical sense signals, respectively, based on the reference and measurement optical signals received by the first and second sensors, respectively, as indicated by block 604. A processor processes the first and second electrical sense signals in accordance with a TOF algorithm to determine first and second TOFs of the reference and measurement optical signals, respectively, as indicated by block 605. The processor then processes the first and second TOFs to determine changes in the first and second TOFs, as indicated by block 606. The processor then processes the change in the second TOF to determine a change in the length of the measurement fiber, as indicated by block 607.

If environmental effects are not of concern, the reference fiber can be eliminated, in which case the steps in FIG. 8 that relate to the reference signal and to the corresponding electrical sense signal can also be eliminated. If environmental effects are to be taken into consideration, then the result obtained at block 607 is further processed based on the TOF change of the reference signal determined at block 606 in the manner described above with reference to FIG. 1 to compensate for environmental effects.

It should be noted that embodiments have been described herein for the purpose of demonstrating the principles and concepts of the invention. As will be understood by persons skilled in the art in view of the description being provided herein, the invention is not limited to these embodiments. For example, while the fiber strain sensor system 1 and 100 are shown as having particular components, other components capable of performing the tasks described above can be used and the systems 1 and 100 may contain additional components or fewer components than what is shown in FIGS. 1 and 2. Also, variations can be made to the methods described above with reference to FIGS. 5-8 without deviating from the principles and concepts of the invention. Persons of skill in the art will understand that these and other modifications may be made to the embodiments described herein without deviating from the principles and concepts of the invention and that all such modifications are within the scope of the invention.

What is claimed is:

1. An optical fiber strain sensor system comprising:
   a signal generator that generates a modulated electrical signal;
   at least a first light source that receives the modulated electrical signal and produces a modulated optical signal having a first phase;
   at least a measurement optical fiber secured to a structure;
   an optical coupler that receives the modulated optical signal and couples at least a measurement optical signal portion of the modulated optical signal into at least a first end of the measurement optical fiber;
   a three-dimensional (3-D) pixel sensor having at least a first pixel, the measurement optical signal portion passing out of a second end of the measurement optical fiber and being received by the first pixel and being converted by the first pixel into a first electrical sense signal, the first pixel having a first pixel circuit, the first pixel circuit receiving a clock signal used by the signal generator to generate the modulated electrical signal and cross-correlating the clock signal with the first electrical sense signal to produce a first cross-correlation result;
   an analog-to-digital converter (ADC) that receives the first cross-correlation result and converts the first cross-correlation result into a first digital cross-correlation result; and
   phase difference determination logic that receives at least the first digital cross-correlation result from the ADC, the phase difference determination logic processing at least the first digital cross-correlation result to determine a change in the phase of the measurement optical signal and to determine, based on the change in the phase of the measurement optical signal, a change in a length of the measurement optical fiber, and wherein the change in the length of the measurement optical fiber is indicative of stress or strain in the structure to which the measurement optical fiber is secured.

2. The optical fiber strain sensor system of claim 1, wherein the phase difference determination logic comprises a phase difference measurement circuit that is implemented in a first integrated circuit (IC) die and wherein the light source is implemented in a second IC die that is electrically coupled to the first IC die.

3. The optical fiber strain sensor system of claim 2, wherein the first IC is a field programmable array (FPGA) IC.

4. The optical fiber strain sensor system of claim 2, wherein the first IC is a digital signal processor (DSP) IC.

5. The optical fiber strain sensor system of claim 2, further comprising:
   a control unit for controlling operations of the optical fiber strain sensor system, wherein the control unit is electrically coupled to the phase difference measurement circuit, and wherein the phase difference measurement circuit communicates the change in a length of the measurement optical fiber to the control unit.

6. The optical fiber strain sensor system of claim 5, wherein the control unit is also implemented in the first IC die.

7. The optical fiber strain sensor system of claim 1, further comprising:
   a reference optical fiber, and wherein the optical coupler is an optical splitter, and wherein the optical splitter receives the modulated optical signal and splits the modulated optical signal into at least the measurement optical signal portion and a reference optical signal portion and couples the reference optical signal portion into a first end of the reference optical fiber and couples the measurement optical signal portion into the first end of the measurement optical fiber, and wherein the 3-D pixel sensor further includes at least a second pixel, the reference optical signal portion passing out of a second end of the reference optical fiber and being received by the second pixel and being converted by the second pixel into a second electrical sense signal, the second pixel having a second pixel circuit, the second pixel circuit receiving the clock signal used by the signal generator to generate the modulated electrical signal and cross-correlating the clock signal with the second electrical sense signal to produce a second cross-correlation result, the ADC receiving the second cross-correlation result and convert the second cross-correlation result into a second digital cross-correlation result, and wherein the phase difference determination logic receives at least the second digital cross-correlation result and processes at least the second digital cross-correlation result to determine a change in the phase of the reference optical signal portion and to determine, based on the change in the phase of the reference optical signal portion, a change in a length of the reference optical fiber.

8. The optical fiber strain sensor system of claim 7, wherein the phase difference measurement circuit uses the determination of the change in the length of the reference fiber to adjust the determination of the change in the length of the measurement fiber to compensate for one or more environmental effects on the measurement fiber, and wherein the adjusted determination of the change in the length of the measurement fiber is an environmentally-compensated indication of stress or strain in the structure to which the measurement fiber is secured.

9. An optical fiber strain sensor system comprising:
   a signal generator that generates a modulated electrical signal;
   a first light source that receives the modulated electrical signal and produces a first modulated optical signal having a first phase;
   a second light source that receives the modulated electrical signal and produces a second modulated optical signal having the first phase;
   at least first and second optical fibers, wherein at least the second optical fiber is fixedly secured at multiple locations along the second optical fiber to a structure;
   an optical coupler that receives the first and second modulated optical signals and couples the first and second modulated optical signals into first ends of the first and second optical fibers, respectively;
   a three-dimensional (3-D) pixel sensor having at least first and second pixels, the first and second modulated optical signals passing out of second ends of the first and second optical fibers, respectively, and being received by the first and second pixels, respectively, and being converted by the first and second pixels into first and second electrical sense signals, respectively, the first and second pixels having first and second pixel circuits, respectively, the first and second pixel circuits receiving a clock signal that is used by the signal generator to generate the modulated electrical signal, the first and second pixel circuits cross-correlating the clock signal with the first and second electrical sense signals to produce first and second cross-correlation results, respectively;

an analog-to-digital converter (ADC) that receives at least the first and second cross-correlation results and converts the first and second cross-correlation results into first and second digital cross-correlation results, respectively; and phase difference determination logic that receives at least the first and second digital cross-correlation results from the ADC, the phase difference determination logic processing at least the first and second cross-correlation results to determine changes in the phases of the first and second optical signals, respectively, and to determine, based on the changes in the phases of the first and second optical signals, changes in lengths of the first and second optical fibers, respectively, and wherein the change in the length of the second optical fiber is indicative of stress or strain in the structure to which the second optical fiber is secured.

10. The optical fiber strain sensor system of claim 9, wherein the phase difference determination logic uses the determination of the change in the length of the first optical fiber to adjust the determination of the change in the length of the second fiber to compensate for one or more environmental effects on the second optical fiber, and wherein the adjusted determination of the change in the length of the second fiber is an environmentally-compensated indication of stress or strain in a structure to which the second optical fiber is secured.

11. The optical fiber strain sensor system of claim 10, wherein the first optical fiber is also fixedly secured at multiple locations along the first optical fiber to the structure, and wherein the change in the length of the first optical fiber is indicative of stress or strain in the structure to which the first and second optical fibers are secured.

12. The optical fiber strain sensor system of claim 11, further comprising:

a third light source that receives the modulated electrical signal and produces a third modulated optical signal having the first phase;

at least a third optical fiber, wherein the optical coupler receives the third modulated optical signal and couples the third modulated optical signal into a first end of the third optical fiber, and wherein the 3-D pixel sensor further includes at least a third pixel, the third optical signal passing out of a second end of the third optical fiber and being received by the third pixel and being converted by the third pixel into a third electrical sense signal, the third pixel having a third pixel circuit, the third pixel circuit receiving the clock signal that is used by the signal generator to generate the modulated electrical signal, the third pixel circuit cross-correlating the clock signal with the third electrical sense signal to produce a third cross-correlation result, and wherein the ADC receives at least the third cross-correlation result and converts the third cross-correlation result into a third digital cross-correlation result, and wherein the phase difference determination logic receives third digital cross-correlation result from the ADC and processes the third cross-correlation result to determine a change in the phase of the third optical signal, and to determine, based on the change in the phase of the third optical signal, a change in length of the third optical fiber.

13. The optical fiber strain sensor system of claim 12, wherein the phase difference determination logic uses the determination of the change in the length of the third optical fiber to adjust the determination of the changes in the lengths of the first and second optical fibers to compensate for one or more environmental effects on the first and second optical fibers, and wherein the adjusted determinations of the changes in the lengths of the first and second optical fibers are environmentally-compensated indications of stress or strain in the structure to which the first and second optical fibers are secured.

14. The optical fiber strain sensor system of claim 9, wherein the 3-D pixel sensor comprises an array of pixels, and wherein the first and second pixels are part of the array of pixels, and wherein the first optical signal is received by a first group of pixels of the array that includes the first pixel, and wherein the second optical signal is received by a second group of pixels of the array that includes the second pixel.

15. A method for using an optical fiber to measure strain or stress in a structure, the method comprising:

with a signal generator, generating a modulated electrical signal;

driving at least a first light source with the modulated electrical signal to cause the first light source to produce a modulated optical signal having a first phase;

with an optical coupler, coupling at least a measurement optical signal portion of the modulated optical signal into at least a first end of a measurement optical fiber, the measurement optical fiber being secured at multiple locations of the measurement optical fiber to a structure;

in a three-dimensional (3-D) pixel sensor, receiving the measurement optical signal portion passing out of a second end of the measurement optical fiber on a first pixel of the 3-D pixel sensor;

with the first pixel, converting the measurement optical signal portion into a first electrical sense signal;

in a first pixel circuit of the first pixel, receiving a clock signal used by the signal generator to generate the modulated electrical signal and cross-correlating the clock signal with the first electrical sense signal to produce a first cross-correlation result;

converting the first cross-correlation result into a first digital cross-correlation result; and in phase difference determination logic, processing at least the first digital cross-correlation result to determine a change in the phase of the measurement optical signal and to determine, based on the change in the phase of the measurement optical signal, a change in a length of the measurement optical fiber, and wherein the change in the length of the measurement optical fiber is indicative of stress or strain in the structure to which the measurement optical fiber is secured.

16. The method of claim 15, wherein the optical coupler is an optical splitter that splits the modulated optical signal into at least the measurement optical signal portion and a reference optical signal portion, the method further comprising:

with the optical splitter, coupling the reference optical signal portion into a first end of the reference optical fiber;

in 3-D pixel sensor, receiving the reference optical signal portion passing out of a second end of the reference optical fiber in a second pixel of the 3-D pixel sensor;

with the second pixel, converting the reference optical signal portion into a second electrical sense signal;

in a second pixel circuit of the second pixel, receiving the clock signal used by the signal generator to generate the modulated electrical signal and cross-correlating the clock signal with the second electrical sense signal to produce a second cross-correlation result;

converting the second cross-correlation result into a second digital cross-correlation result; and in the phase difference determination logic, processing at least the second digital cross-correlation result to determine a change in the phase of the reference optical signal and to determine, based on the change in the phase of the reference optical signal, a change in a length of the reference optical fiber, and wherein the phase difference determination logic uses the determination of the change in the length of the reference fiber to adjust the determination of the change in the length of the measurement fiber to compensate for one or more environmental effects on the measurement optical fiber.

17. The method of claim 16, wherein the phase difference determination logic comprises a phase difference measurement circuit that is implemented in a first integrated circuit (IC) die and wherein the first light source is implemented in a second IC die that is electrically coupled to the first IC die.

18. The method of claim 17, further comprising:
with the phase difference measurement circuit, sending the adjusted change in the length of the measurement optical fiber to a control unit, wherein the control unit is implemented on the first IC die.

19. A method for using an optical fiber to measure strain or stress in a structure, the method comprising:
with a signal generator, generating a modulated electrical signal;

driving at least first and second light sources with the modulated electrical signal to cause the first and second light sources to produce first and second modulated optical signals, respectively, the first and second optical signals having a first phase;

with an optical coupler, coupling the first and second modulated optical signals into first ends of the first and second optical fibers, respectively, wherein at least the second optical fiber is fixedly secured at multiple locations along the second optical fiber to a structure;

in a three-dimensional (3-D) pixel sensor, receiving the first and second modulated optical signals passing out of second ends of the first and second optical fibers, respectively;

with a first pixel of the 3-D pixel sensor, converting the first optical signal into a first electrical sense signal;

with a second pixel of the 3-D pixel sensor, converting the second optical signal into a second electrical sense signal;

in a first pixel circuit of the first pixel, receiving a clock signal used by the signal generator to generate the modulated electrical signal and cross-correlating the clock signal with the first electrical sense signal to produce a first cross-correlation result;

in a second pixel circuit of the second pixel, receiving the clock signal used by the signal generator to generate the modulated electrical signal and cross-correlating the clock signal with the second electrical sense signal to produce a second cross-correlation result;

converting the first and second cross-correlation results into first and second digital cross-correlation results, respectively; and in phase difference determination logic, processing at least the first and second cross-correlation results to determine changes in the phases of the first and second optical signals, respectively, and to determine, based on the changes in the phases of the first and second optical signals, changes in lengths of the first and second optical fibers, respectively, and wherein the change in the length of the second optical fiber is indicative of stress or strain in the structure to which the second optical fiber is secured.

20. The method of claim 19, further comprising:
in the phase difference determination logic, using the determination of the change in the length of the first optical fiber to adjust the determination of the change in the length of the second fiber to compensate for one or more environmental effects on the second optical fiber, and wherein the adjusted determination of the change in the length of the second fiber is an environmentally-compensated indication of stress or strain in a structure to which the second optical fiber is secured.

21. The method of claim 19, wherein the first optical fiber is also fixedly secured at multiple locations along the first optical fiber to the structure, and wherein the change in the length of the first optical fiber is indicative of stress or strain in the structure to which the first and second optical fibers are secured.

22. The method of claim 21, further comprising:
driving at least a third light source with the modulated electrical signal to cause the third light source to produce a third modulated optical signal having the first phase;

with the optical coupler, coupling the third modulated optical signal into a first end of a third optical fiber;

in 3-D pixel sensor, receiving the third optical signal passing out of a second end of the third optical fiber;

with a third pixel of the 3-D pixel sensor, converting the third optical signal into a third electrical sense signal;

in a third pixel circuit of the third pixel, receiving the clock signal used by the signal generator to generate the modulated electrical signal and cross-correlating the clock signal with the third electrical sense signal to produce a third cross-correlation result;

converting the third cross-correlation result into a third digital cross-correlation result; and in the phase difference determination logic, processing the third cross-correlation result to determine a change in the phase of the third optical signal, and to determine, based on the change in the phase of the third optical signal, a change in length of the third optical fiber.

23. The method of claim 22, wherein the phase difference determination logic uses the determination of the change in the length of the third optical fiber to adjust the determinations of the changes in the lengths of the first and second optical fibers to compensate for one or more environmental effects on the first and second optical fibers, and wherein the adjusted determinations of the changes in the lengths of the first and second optical fibers are environmentally-compensated indications of stress or strain in the structure to which the first and second optical fibers are secured.

24. The method of claim 19, wherein the 3-D pixel sensor comprises an array of pixels, and wherein the first and second pixels are part of the array of pixels, and wherein the first optical signal is received by a first group of pixels of the array that includes the first pixel, and wherein the second optical signal is received by a second group of pixels of the array that includes the second pixel.

* * * * *